United States Patent [19]

Carabine

[11] Patent Number: 5,554,302
[45] Date of Patent: Sep. 10, 1996

[54] CORE BLOW NOZZLE

[75] Inventor: Alan M. Carabine, Kaysville, Utah

[73] Assignee: Baker Hughes Incorporated, Houston, Tex.

[21] Appl. No.: 413,637

[22] Filed: Mar. 30, 1995

[51] Int. Cl.⁶ .................................................. B01D 25/32
[52] U.S. Cl. ............................................ 210/791; 210/225
[58] Field of Search .................................. 210/225, 230, 210/791; 100/196–198, 37

[56] References Cited

U.S. PATENT DOCUMENTS 652,588  6/1900  Boag ........................................ 210/230

Primary Examiner—Matthew O. Savage
Attorney, Agent, or Firm—Trask, Britt & Rossa

[57] ABSTRACT

An apparatus for facilitating the removal of slurry, remaining in the feed core of a filter press having central feed filter plates, is disclosed. The apparatus is utilized during the core blow process of directing pressurized air into the feed core, in the opposite direction of the slurry feed, after the filtration cycle is completed. During the core blow process, the apparatus, which is attachable to the follower liner plate, facilitates the removal of remnant slurry by diverting the pressurized air within the feed core.

11 Claims, 4 Drawing Sheets

CORE BLOW NOZZLE

BACKGROUND

1. Field

The invention relates generally to the separation of liquids and solids by means of plate type pressure filters, specially filter presses utilizing center feed filter chambers. More particularly, this invention relates to an improved core blow process performed after a completed filtration cycle.

2. Description of the Art

The filter press apparatus has been used for more than one hundred years and is well known in the art. Filter presses are described in numerous United States Patents. See, for example, U.S. Pat. No. 4,293,417. The filter press is used to separate solids from a mixture of solids and liquid, or slurry. These devices are used in various industries including, for example, mining operations and sewage treatment.

A filter press generally includes a plurality of separable plates. These plates are slidably held on a frame structure between a fixed support and an opposing moveable support. The moveable support, known generally as a follower, is actuated typically by a hydraulic ram. A simple manual screw and capstan may be used, however, for small filter presses.

The filter plates are typically arranged in parallel about a horizontal axis. In order to effect filtering, the row of plates are compressed one against another by, for example, a horizontally mounted hydraulic ram. The compression of the plates, one against another, serves to form a sealed abutment of each plate against its neighboring plates. Filter cloths are typically suspended between the cavities defined by the adjacent filter plates, or caulked into grooves formed in the individual filter plates. Each filter plate contains a hole in the recessed portion of the plate, thereby defining a horizontal feed core through the stack of filter plates. This type of plate, having a hole in the recessed portion of the plate, is typically referred to as a center feed plate, though the term is somewhat of a misnomer since the hole need not be in the center of the plate. A filter liner plate is placed at each end of the row of filter plates. The filter liner plate adjacent to the follower is typically referred to as the follower liner plate.

A feed stream is fed through the core under pressure, whereby the slurry is forced through the cavities between filter plates. The solids within the stream are retained by the filter cloth as the stream passes through the cloth. After the cloths become sufficiently laden with solid deposits, efficient operation of the press requires the removal of the cakes formed from the solid deposits retained by the filter cloths.

After the feed stream is halted, remnants of slurry from the feed stream typically remain in the feed core. Any slurry remaining in the core can cause significant problems. When the filter press opens and the filter cakes are discharged any remaining feed core slurry will run down the plate surfaces and may build up on stay bosses and lower sealing surfaces. This cake build up, when the press is again closed and pressurized, may cause structural damage to the filter plates or even to the filter press itself. In addition, liquid remaining in the feed core, which subsequently seeps into the cakes, increases the moisture content of the cakes. Minimal cake moisture is essential to avoid sticking to conveyor belts or other materials handling equipment, and where the solids must be transported significant distances. Finally, significant labor is required to remove the slurry remaining in the core.

To mitigate the problems associated with the slurry remnants in the core, a core blow process is typically performed whereby air is blown at high pressure through the core in the opposite direction of the feed stream. This process, typically performed shortly after the feed stream is halted, is used to remove the slurry remaining in the core. The core blow process is typically performed by two methods, depending primarily on the type of ram used in the filter press.

In filter presses utilizing a ram press wherein the ram arm does not press against the follower on the opposite side of the feed core, a horizontal, and typically cylindrical, passageway along the axis of the feed core is formed through the follower liner plate and the follower. After the filtration cycle is finished, a pressurized air supply is then attached to this passageway to force the remnants of slurry back out through the entrance of the slurry feed. This procedure is termed a horizontal-feed core blow process.

In other ram presses, whereby the ram arm presses against that portion of the follower on the opposite side of the feed core, a horizontal passageway through the follower and leading into the feed core cannot be formed. To avoid interference with the ram arm, a vertical passageway is formed between the top surface of the follower liner plate and a horizontal chamber formed partway through the follower liner plate leading into the feed core. A pressurized air source is then attached to the top surface of the follower liner plate whereby the pressurized air is directed into the vertical passageway, through the horizontal chamber, and into the feed core. This procedure is termed a vertical-feed core blow process.

In both types of filter presses, the core blow process is ineffective for removing all of the slurry remnants in the feed core. This ineffectiveness results in part from the fact that the pressurized air line is smaller in diameter than the feed core. Practical limitations restrict the size of the pressurized air line, particularly in those filter presses where the pressurized air source is attached to the top surface of the follower liner plate, whereby the pressurized air line must be smaller than the width of the follower liner plate.

Because of the relatively large core diameters compared to the compressed air feed lines used in the core blow process, much of the slurry remaining in the feed core is untouched by the pressurized air source. The previously utilized core blow process is therefore ineffective for removing the remnants of slurry in the feed core.

A more effective means of removing the slurry remaining in the feed core is therefore essential to: (1) provide uniform plate sealing; (2) prevent uneven plate stress from residue cake build-up; (3) prevent premature wear of the filter press resulting from uneven plate stress; (4) ensure minimal cake moisture; and (5) reduce maintenance and cost by extending intervals between plate washings.

SUMMARY

An apparatus for diverting a pressurized air source in the feed core of a filter press is disclosed, facilitating removal of slurry remaining in the feed core after the completion of a filtration cycle. An apparatus constructed in accordance with the present invention is adapted for association with a filter press which includes a plurality of filter plates having a center feed core, mounted in essentially parallel and upright fashion upon an elongated frame assembly.

The present embodiment is utilized during the core blow process performed after the filtration cycle is complete and the pressurized supply of slurry into the feed core is discontinued. The present invention utilizes an effective and cost efficient means of diverting a pressurized air source toward the inner wall of the feed core, thereby facilitating the removal of the slurry remnants.

In one embodiment, a right circular cone with a vertex angle of 60 degrees is positioned within the path of the pressurized air source. Other vertex angles may be appropriate, depending in part on the diameter and length of the feed core. The right circular cone is supported, for example, by rods connecting the cone to a base unit. The base unit may be removably attached to the follower liner plate with bolts or screws, for example, or the base unit may be threaded so as to screw into the follower liner plate. In other embodiments, the base unit may be permanently attached to a follower liner plate by an adhesive or by welding, for example.

Use of the present invention in a central feed filter press, during the core blow process, facilitates the removal of slurry remaining in the feed core thereby minimizing cake moisture, improving the integrity of the seals between filter plates, reducing wear and structural damage to the filter plates and the filter press, and reducing maintenance and cleaning costs.

BRIEF DESCRIPTION OF THE DRAWINGS

The previously described features, aspects, and advantages of the present embodiment will become clearer with regard to the following description, appended claims, and accompanying drawings where:

DETAILED DESCRIPTION OF THE ILLUSTRATED EMBODIMENTS

Figure 1:
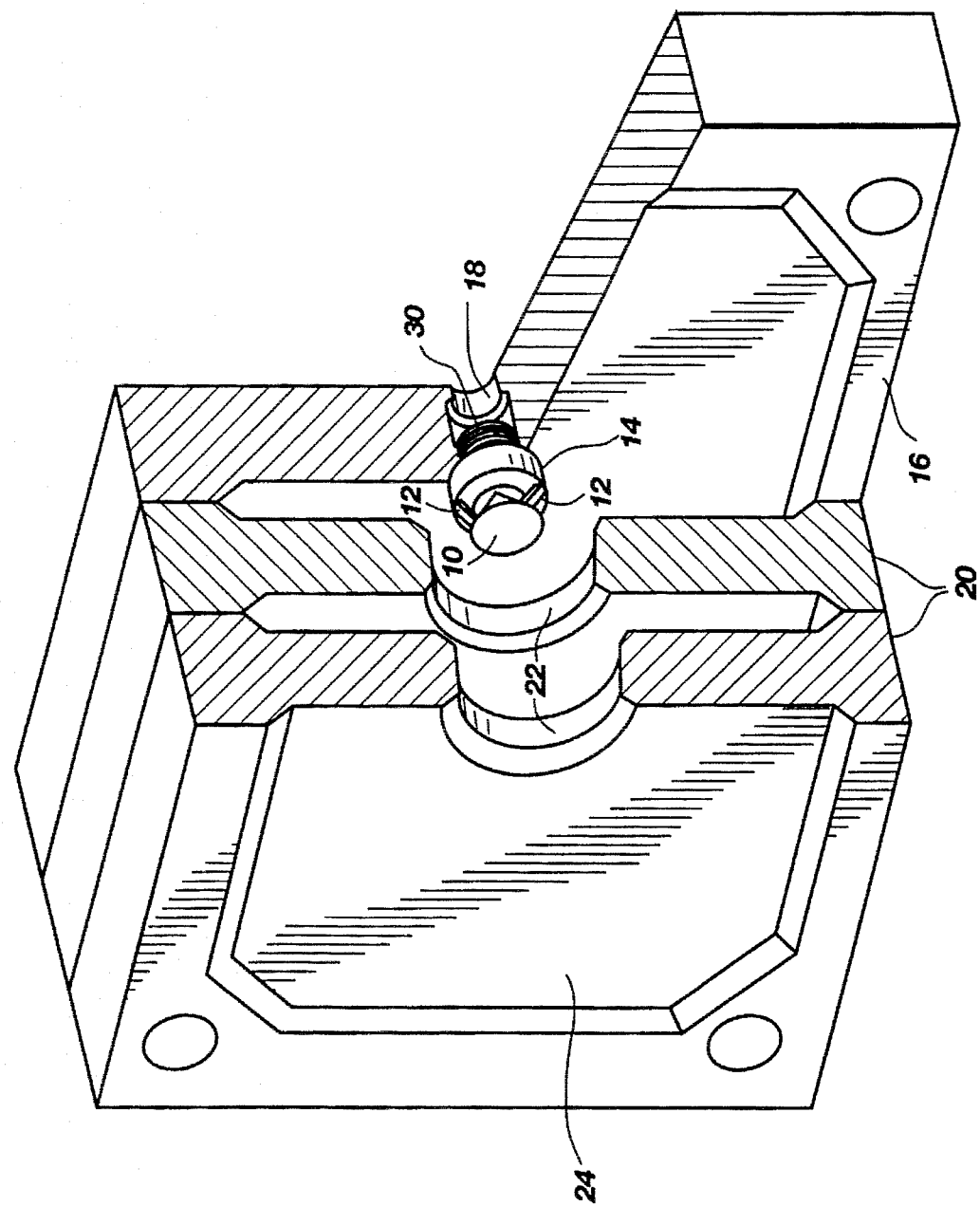
FIG. 1 is a partial perspective cross-sectional view of center feed filter plates of a filter press, and a diverter cone assembly attached to a follower liner plate associated with a horizontal-feed core blow process.

A portion of a typical filter press is illustrated in FIG. 1, wherein a diverter cone 10 is attached by support rods 12 to a base unit 14. In the present embodiment, the cone 10 is a right circular cone having preferably a vertex angle of 60 degrees, although the vertex angle may vary from 10 degrees to 90 degrees. The base unit 14 is attached to a follower liner plate 16 having a horizontal passageway 18 therethrough. Pressurized air (not shown) is directed into the horizontal passageway 18 during the horizontal-feed core blow process. A plurality of center feed filter plates 20 are positioned substantially parallel to, and adjacent with, the follower liner plate 16. In the present embodiment, the center feed filter plates 20 have a single hole 22 through the center of the recessed portion 24 of each filter plate 20. The holes 22, through each of the individual filter plates 20, form a feed core 22 when the filter plates 20 are positioned adjacent one another.

According to one embodiment, the follower liner plate 16, intended for use in conjunction with a horizontal-feed core blow process, is attached to the base unit 14 by threading the male threads 30 on the base unit 14 into the female threads (not shown) in the horizontal passageway 18.

Figure 2:
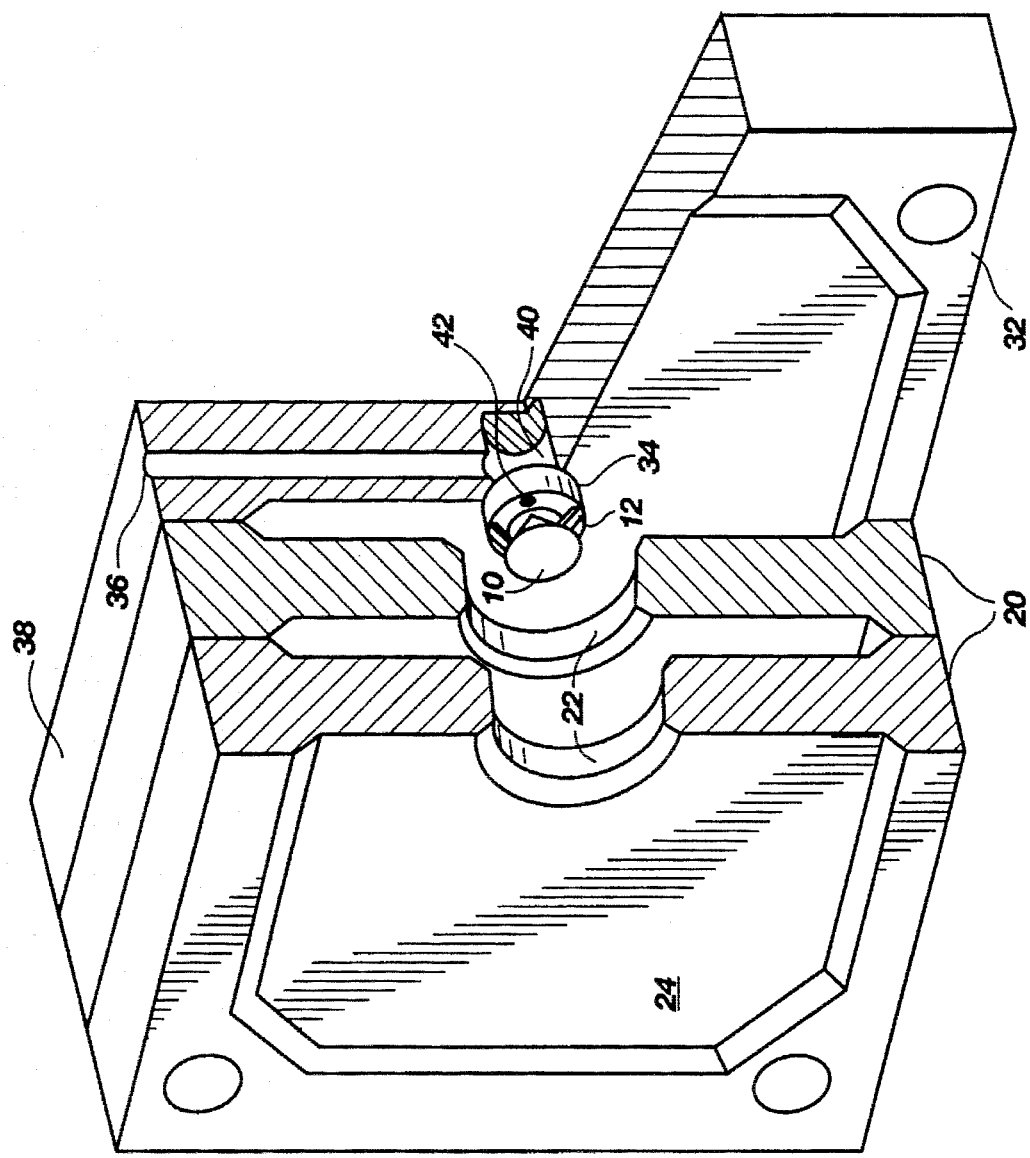
FIG. 2 is a partial perspective cross-sectional view of center feed filter plates of a filter press, and a diverter cone assembly attached to a follower liner plate associated with a vertical-feed core blow process.

Referring to FIG. 2, the same portion of the filter press illustrated in FIG. 1 is shown with an alternative follower liner plate 32, which is intended for use in conjunction with a vertical-feed core blow process, and an alternative base unit 34. The follower liner plate 32 has a vertical passageway 36 connecting the top surface 38 of the follower liner plate 32 to a horizontal chamber 40 formed partway through the follower liner plate 32. During the vertical-feed core blow process, pressurized air (not shown) is directed into the vertical passageway 36, through the horizontal chamber 40, and then into the feed core 22. In a particular embodiment utilizing the follower liner plate 32, the base unit 34 is attached by screws or other suitable threaded fasteners (not shown) through the mounting holes 42 in the base unit 34.

Figure 3:
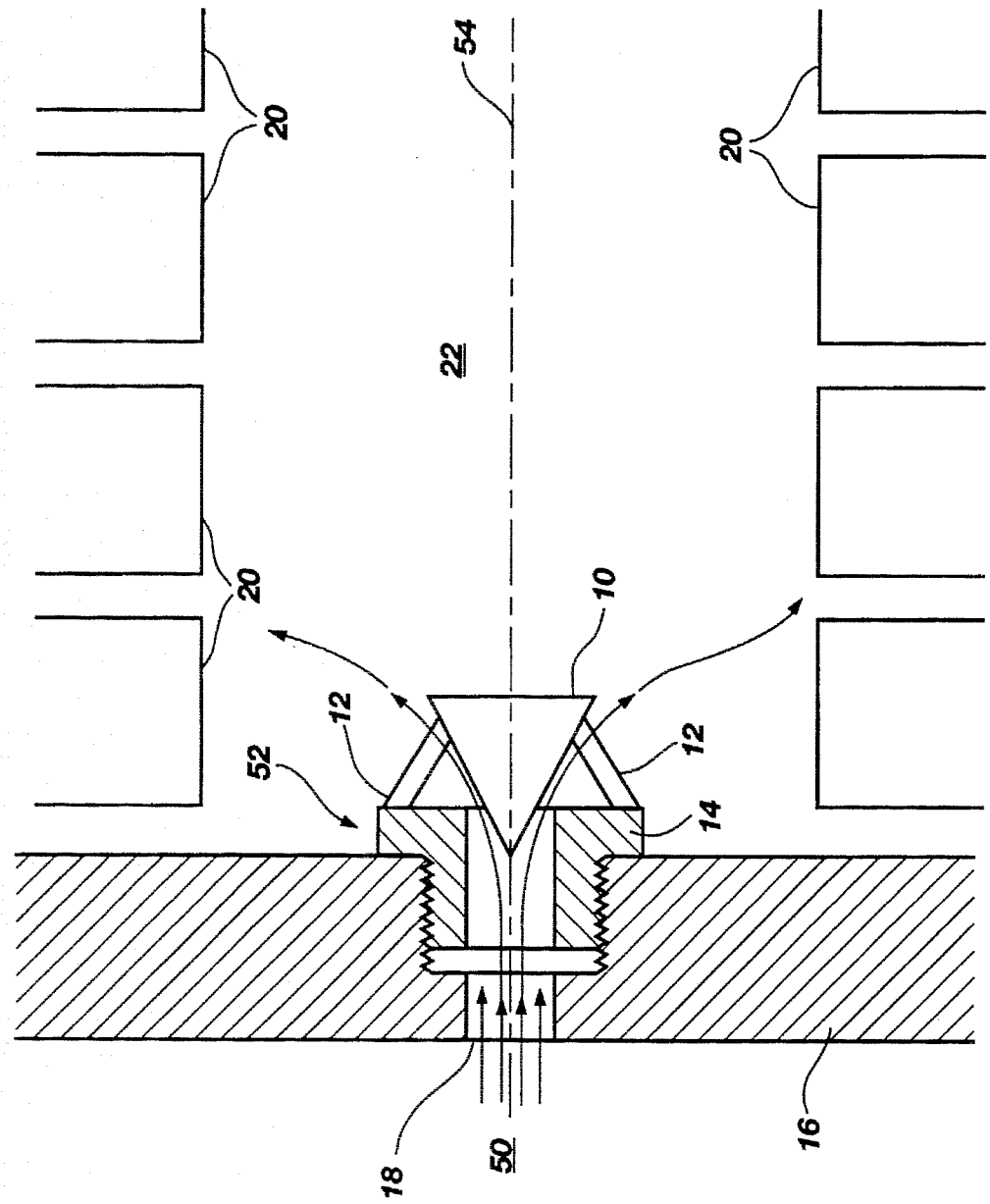
FIG. 3 is a side cross-sectional view of a diverter cone assembly attached to a follower liner plate associated with a horizontal-feed core blow process.

Referring to FIG. 3, a horizontal-feed core blow process directs pressurized air 50 into the horizontal passageway 18. In the preferred embodiment, the diverter assembly 52, secured to the follower liner plate 16, positions the cone 10 so that it is centered about the axial center 54 of the flow of pressurized air 50. During the core blow process, the pressurized air 50 is directed through the horizontal passageway 18 and deflected by the cone 10 toward the surfaces of the filter plates 20, where the slurry remnants (not shown) reside. The pressurized air 50, diverted toward the individual filter plates 20, facilitates the removal of slurry within the feed core 22.

Figure 4:
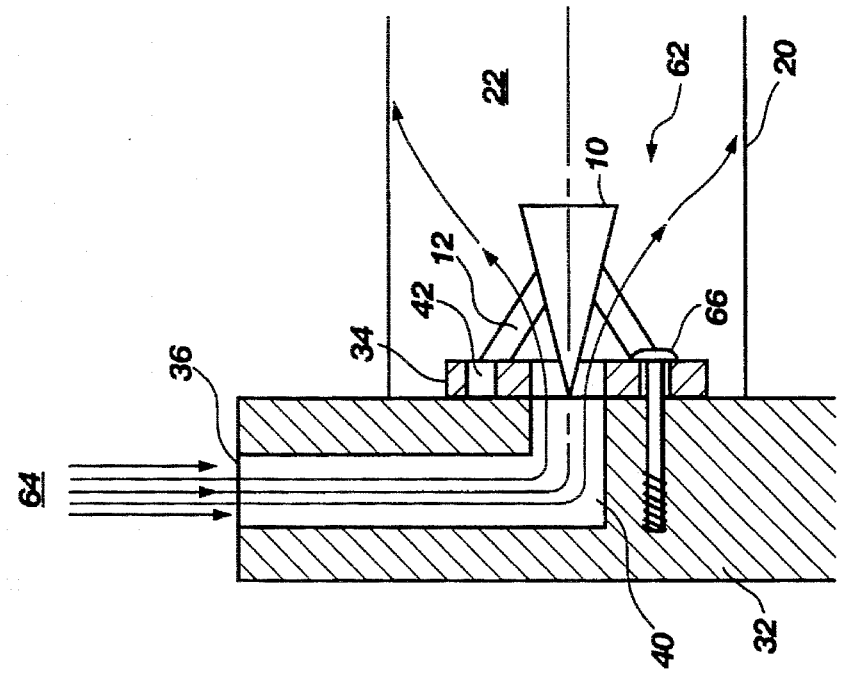
FIG. 4 is a side cross-sectional view of a diverter cone assembly attached to a follower liner plate associated with a vertical-feed core blow process.

FIG. 4 illustrates a diverter assembly 62 for use in conjunction with a vertical-feed core blow process, whereby pressurized air 64 is directed into the vertical passageway 36, through the horizontal chamber 40, and then deflected by the cone 10 toward the filter plates 20, which line the feed core 22. In one embodiment, the cone 10 has a vertex angle of 30 degrees as shown in FIG. 4. The diverter assembly 62 is attached to the follower liner plate 32 with threaded fasteners 66 (one threaded fastener 66 is shown), where the threaded fasteners 66 run through the holes 42 in the base unit 34 and into the follower liner plate 32.

Figure 5B:
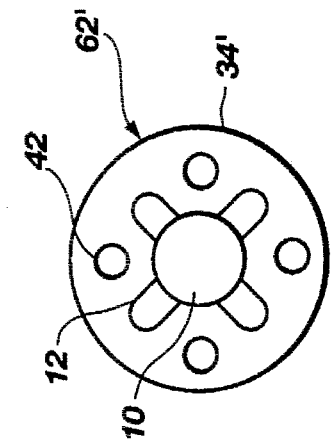
FIG. 5 is a frontal view of two alternative diverter cone assemblies.
Figure 5A:
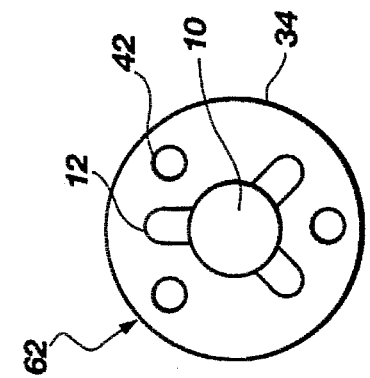

The frontal view of a diverter assembly 62 is shown in FIG. 5-A. In this illustrated embodiment, three support rods 12 are used to secure the cone 10 to the base unit 34, which is further secured to a follower liner plate 16 or 32 (as illustrated in FIGS. 1 and 2) using suitable threaded fasteners (not shown) through three holes 42. FIG. 5-B shows a frontal view of an alternative diverter assembly 62'. In this illustrated embodiment, four support rods 12 are used to secure the cone 10 to the base unit 34', which is further secured to a follower liner plate 16 or 32 (as illustrated in FIGS. 1 and 2) using bolts or screws (not shown) through four holes 42. In other embodiments, the base unit 34 or 34' may be secured to the follower liner plate 16 or 32 (as illustrated in FIGS. 1 and 2) with welding or adhesive bonding, for example.

Referring again to FIGS. 1 and 2, the preferred embodiment envisions that the base unit 14 is attached to the follower liner plate 16 by means of the threads 30 for use with a horizontal-feed core blow process, and the base unit 34 is attached to the follower liner plate 32 by means of suitable threaded fasteners (not shown) for use with a vertical-feed core blow process. In other embodiments, the base unit 14 may be attached with the thread means 30 to the follower liner plate 32, and the base unit 34 may be attached to the follower liner plate 16. Also, any suitable cone 10, such as made from stainless steel, may be used having any desired air deflection angle so long as the air is effectively deflected toward the filter plates 20 in order to clear the slurry from the feed core 22.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for removing remnant slurry from the center feed core of a filter press, said method comprising the steps of:

forcing pressurized air through said center feed core of a filter press, and diverting said pressurized air away from an axial center of said center feed core of said filter press.

2. The method for removing remnant slurry as defined in claim 1 wherein the step of diverting said pressurized air comprises a right circular cone supported in the path of said pressurized air by support bars.

3. A filter press used to separate solids from a slurry, said filter press comprising:

an elongated frame;

a press head mounted on said elongated frame;

a follower mounted on said elongated frame axially movable toward and away from said press head;

a plurality of filter plates each having a center feed core formed therethrough for feeding slurry to said filter plates, said plurality of filter plates being removably positionable on said elongated frame between said press head and said follower, wherein said center feed cores are coaxially aligned with one another;

a follower liner plate positioned on the elongated frame, said follower liner plate being the nearest of said plurality of filter plates to said follower, said follower liner plate including an air inlet passageway coaxially aligned with said center feed cores for feeding pressurized air into said center feed cores; and a diverter member attached to a portion of said follower liner plate adjacent said air inlet passageway for diverting pressurized air flowing through said air inlet passageway away from an axial center of said center feed cores and toward inner surfaces of said center feed cores to remove slurry from said center feed cores.

4. The filter press as defined in claim 3 wherein said diverter member comprises a diverter cone, and support means for supporting said diverter cone such that a tip of said diverter cone faces the air inlet passageway of said follower liner plate.

5. The filter press as defined in claim 4 wherein said diverter cone is a right circular cone having a vertex angle between 10 degrees and 90 degrees.

6. The filter press as defined in claim 4 wherein said diverter cone is formed from stainless steel material.

7. A filter press used to separate solids from a slurry, said filter press comprising:

an elongated frame assembly;

a stationary press head mounted on said elongated frame assembly;

a follower head mounted spacedly apart from said stationary press head onto said elongated frame, said follower head being axially movable toward and away from said stationary press head;

a plurality of center feed filter plates positioned on said elongated frame assembly between said stationary press head and said follower head, each filter plate of said plurality of filter plates including a center feed core formed therethrough for feeding slurry to said filter plates;

a follower liner plate positioned on said elongated frame assembly between said center feed filter plates and said follower head, said follower liner plate including an air inlet passageway coaxially aligned with said center feed cores for feeding pressurized air into said center feed cores; and a diverter cone assembly attachable to said follower plate, said diverter cone assembly comprising a right circular cone positioned such that a tip of said diverter cone assembly faces the air inlet passageway of said follower liner plate, a base, a plurality of support rods having two ends, wherein the first of said ends is attached to said base and a second of said ends is attached to said cone, and attachment means for attaching said diverter cone assembly to said follower liner plate, whereby said diverter cone assembly diverts pressurized air supplied via said air inlet passageway away from an axial center of said center feed cores and toward an inner surface of said center feed cores to remove slurry from said center feed cores.

8. The filter press as defined in claim 7 wherein said right circular cone has a vertex angle between 10 degrees and 90 degrees.

9. The filter press as defined in claim 7 wherein said right circular cone is formed from stainless steel material.

10. The filter press as defined in claim 7 wherein said attachment means comprises a thread means for screwing said diverter cone assembly into said follower liner plate.

11. The filter press as defined in claim 7 wherein said attachment means comprises a plurality of threaded rods driven through said base of said diverter cone assembly and into said follower liner plate.

* * * * *